(12) United States Patent
Jeong et al.

(10) Patent No.: US 9,321,077 B2
(45) Date of Patent: Apr. 26, 2016

(54) PLATING METHOD

(75) Inventors: Hyun-Ju Jeong, Pohang-si (KR);
Rho-Bum Park, Gwangyang-si (KR);
Yeong-Seob Kueon, Pohang-si (KR);
Hyeong-Jun Huh, Pohang-si (KR);
Jin-Gun Jang, Pohang-si (KR)

(73) Assignee: POSCO, Pohang-Si (KR)

( * ) Notice: Subject to any disclaimer, the term of this patent is extended or adjusted under 35 U.S.C. 154(b) by 0 days.

(21) Appl. No.: 13/997,829

(22) PCT Filed: Dec. 27, 2011

(86) PCT No.: PCT/KR2011/010154
§ 371 (c)(1),
(2), (4) Date: Jun. 25, 2013

(87) PCT Pub. No.: WO2012/091409
PCT Pub. Date: Jul. 5, 2012

(65) Prior Publication Data
US 2013/0288073 A1    Oct. 31, 2013

(30) Foreign Application Priority Data

Dec. 27, 2010    (KR) .................. 10-2010-0136019

(51) Int. Cl.
*B05D 3/14* (2006.01)
*B32B 15/01* (2006.01)
(Continued)

(52) U.S. Cl.
CPC .............. *B05D 3/142* (2013.01); *B32B 15/013* (2013.01); *C21D 1/38* (2013.01); *C21D 8/0478* (2013.01);
(Continued)

(58) Field of Classification Search
CPC ................. Y10T 428/12799; B32B 15/013; C23C 2/02; C23C 2/003; C23C 2/06; C23C 2/40
USPC ......................................... 428/659
See application file for complete search history.

(56) References Cited

U.S. PATENT DOCUMENTS 5,312,529 A * 5/1994 Antonelli et al. ............. 204/486
5,948,172 A * 9/1999 Neiheisel ........................ 134/1
(Continued)

FOREIGN PATENT DOCUMENTS

| CN | 1495278 A | 5/2004 |
|---|---|---|
| CN | 1762643 A | 4/2006 |

(Continued)

OTHER PUBLICATIONS

Machine Translation, Kim et al., KR 10-2005-0042513, May 2005.*
(Continued)

*Primary Examiner* — Michael E La Villa
(74) *Attorney, Agent, or Firm* — The Webb Law Firm

(57) ABSTRACT

There is provided a method and apparatus for plating high strength steel such as advanced high strength steel (AHSS) after irradiating the high strength steel with at least one of laser light and plasma to remove Si/Mn/Al oxides from the surface of the high strength steel, modify the surface of the high strength steel, or make the surface of the high strength steel suitable for a post process such as a zinc plating process. For this, a plating method includes heating high strength steel; treating a surface of the high strength steel with plasma to remove at least one of a Mn oxide, an Al oxide, and an Si oxide formed on the surface of the high strength steel during the heating of the high strength steel; and plating the surface-treated high strength steel.

7 Claims, 18 Drawing Sheets

(51) Int. Cl.
  *C21D 1/38* (2006.01)
  *C21D 8/04* (2006.01)
  *C21D 9/46* (2006.01)
  *C21D 9/56* (2006.01)
  *C21D 11/00* (2006.01)
  *C23C 2/02* (2006.01)
  *C23C 2/00* (2006.01)
  *C23C 2/06* (2006.01)
  *C23C 2/40* (2006.01)
  *C21D 1/09* (2006.01)
  *C21D 1/34* (2006.01)

(52) U.S. Cl.
  CPC .. *C21D 9/46* (2013.01); *C21D 9/56* (2013.01); *C21D 11/00* (2013.01); *C23C 2/003* (2013.01); *C23C 2/02* (2013.01); *C23C 2/06* (2013.01); *C23C 2/40* (2013.01); *C21D 1/09* (2013.01); *C21D 1/34* (2013.01); *Y10T 428/12799* (2015.01)

(56) References Cited

U.S. PATENT DOCUMENTS

| | | |
|---|---|---|
| 2003/0111144 A1 | 6/2003 | Matsuoka et al. |
| 2006/0037996 A1 | 2/2006 | Weinzierl et al. |
| 2006/0177596 A1 | 8/2006 | De Meyer et al. |
| 2007/0010069 A1* | 1/2007 | Bushroe et al. ............... 438/473 |
| 2010/0065160 A1 | 3/2010 | Meurer et al. |

FOREIGN PATENT DOCUMENTS

| | | |
|---|---|---|
| CN | 1809653 A | 7/2006 |
| CN | 101506403 A | 8/2009 |
| JP | 04337057 A | 11/1992 |
| JP | 05-295511 | 11/1993 |
| JP | 06-146025 A | 5/1994 |
| JP | 06-293980 A | 10/1994 |
| JP | 06336662 A | 12/1994 |
| JP | 07-018465 | 1/1995 |
| JP | 2001140051 A | 5/2001 |
| KR | 20050042298 A | 5/2005 |
| KR | 20050042513 A | 5/2005 |
| KR | 0830116 A | 5/2008 |

OTHER PUBLICATIONS

Machine Translation, Tada et al., JP 2001-140051, May 2001.*
Machine Translation, Adachi et al., JP 06-336662, Dec. 1994.*
Machine Translation, Morita, et al., JP 06-146025, May 1994.*

* cited by examiner

PLATING METHOD

CROSS REFERENCE TO RELATED APPLICATION

This application claims the benefit of International Patent Application No. PCT/KR2011/010154 entitled "Plating Method and Zinc Plating Process", which claims priority to Korean Application No. 10-2010-0136019, filed Dec. 27, 2010, which are hereby incorporated by reference in their entirety.

TECHNICAL FIELD

The present invention relates to a method for plating a steel sheet and a zinc plating process using the method, and more particularly, to a plating method for removing at least one of a Mn oxide, an Al oxide, and an Si oxide formed on the surface of high strength steel during annealing by using plasma, or plasma and laser light, and a zinc plating process using the plating method.

BACKGROUND ART

Recently, advanced high strength steel (AHSS) having a tensile strength of 490 MPa or greater, examples of which include twining induced plasticity (TWIP) steel and transformation inducted plasticity (TRIP) steel, has been developed.

However, when such AHSS is annealed, Si/Mn/Al contained therein may be diffused to the surface thereof to form an Si/Mn/Al oxide layer having a thickness of several tens to several hundreds of nanometers (nm). Si/Mn/Al oxides may prevent the adhesion of molten zinc to AHSS during hot-dip galvanization to cause plating faults.

FIGS. 1 and 2 are a surface analysis graph and a depth profile graph of TWIP steel. Referring to FIGS. 1 and 2, Mn oxides and Al oxides that prevent the adhesion of zinc are formed on the surface of the TWIP steel.

FIGS. 3 and 4 are a surface analysis graph and a depth profile graph of TRIP steel. Referring to FIGS. 3 and 4, Si oxides and Mn oxides are formed on the surface of the TRIP steel. Like TWIP steel, TRIP steel is also difficult to galvanize due to the presence of Si oxides and Mn oxides.

Zinc plating protects steel electrochemically. Non-galvanized steel has a low degree of corrosion resistance, and thus it is difficult to use non-galvanized steel as a material for exterior frames. Even high strength steel such as TWIP steel and TRIP steel is also difficult to use as a material for exterior frames if not galvanized.

Therefore, it is necessary to develop techniques for removing Si/Mn/Al oxides from AHSS. Various attempts have been made to remove Si/Mn/Al oxides from the surface of AHSS or to prevent the formation of Si/Mn/Al on the surface of AHSS, but there is, as yet, no result.

Particularly, since Si/Mn/Al oxide films are formed on the surface of AHSS in the form of islands or networks with a large amount of bonding strength therebetween, it is difficult to remove such Si/Mn/Al oxide films from AHSS.

SUMMARY OF THE INVENTION

An aspect of the present invention provides a method and apparatus for plating high strength steel such as advanced high strength steel (AHSS) after irradiating the high strength steel with at least one of laser light and plasma to remove Si/Mn/Al oxides from the surface thereof, modify the surface of the high strength steel, or make the surface of the high strength steel suitable for a post process such as a zinc plating process.

Another aspect of the present invention provides a method for plating high strength steel such as AHSS after rapidly and effectively removing Si/Mn/Al oxides from the surface of the high strength steel or rapidly and effectively modifying the surface of the high strength steel so as to allow the plating process to be continuously performed.

Another aspect of the present invention provides a plating method and process that can be continuously performed after an annealing process.

The present invention provides a plating method and a zinc plating process for the above-mentioned purposes.

According to an aspect of the present invention, there is provided a plating method including: heating high strength steel; treating a surface of the high strength steel with plasma to remove at least one of a Mn oxide, an Al oxide, and an Si oxide formed on the surface of the high strength steel during the heating of the high strength steel; and plating the surface-treated high strength steel.

The treating of the surface of the high strength steel may include irradiating the surface of the high strength steel with plasma at a temperature of 200° C. to 900° C.

The treating of the surface of the high strength steel may include: generating plasma in a nitrogen atmosphere at a temperature of 200° C. to 800° C.; and supplying the nitrogen gas as a feed gas for the plasma.

The treating of the surface of the high strength steel may include irradiating the high strength steel with plasma and plasma arcs after negatively charging the high strength steel.

The treating of the surface of the high strength steel may be performed in an isolated chamber after removing gas from the chamber to lower an internal pressure of the chamber and thus to increase an irradiation range of plasma.

The treating of the surface of the high strength steel may include irradiating the high strength steel with plasma and CW (continuous wave) laser light having a wavelength of 1064 nm or less.

The laser light may have a spot size of 1 mm or less, or the laser light may be a laser beam having a width of 1 mm or less.

In the treating of the surface of the high strength steel, the laser light and the plasma may be directed to the same position.

According to another aspect of the present invention, there is provided twining induced plasticity (TWIP) steel or transformation induced plasticity (TRIP) steel plated with zinc by the plating method.

According to another aspect of the present invention, there is provided a zinc plating process including: an annealing apparatus; a surface treatment apparatus; and a plating apparatus receiving a steel sheet from the surface treatment apparatus and plating the steel sheet with zinc, wherein the annealing apparatus includes: a chamber disposed behind the annealing apparatus and filled with nitrogen as an atmosphere gas at a temperature of 200° C. to 800° C. so as to remove at least one of a Mn oxide, an Al oxide, and an Si oxide formed on a steel sheet during annealing; and a plasma generator disposed in the chamber to irradiate the steel sheet with plasma to remove the least one oxide.

The chamber may include an atmosphere gas suction part, and the atmosphere gas suction part may be connected to a feed gas supply part of the plasma generator to use the atmosphere gas as a feed gas of the plasma generator.

A blocking part may seal the chamber while allowing a steel sheet to be moved into and out of the chamber, the chamber may include an atmosphere gas suction part, an atmosphere gas supply hole, and a pressure sensor detecting an internal pressure of the chamber, and the internal pressure of the chamber may be maintained at a level lower than atmospheric pressure.

The blocking part may include sealing rolls, wherein the sealing rolls and shafts of the sealing rolls may be formed of conductive materials, and the shafts may be grounded to a negative electrode to ground a steel sheet passing through the chamber to the negative electrode, wherein the plasma generator may be spaced apart from a steel sheet to irradiate the steel sheet with plasma and plasma arcs.

The zinc plating process may further include a laser disposed in front of or behind the plasma generator to emit laser light in the direction of a surface of a steel sheet, wherein the laser may be a CW laser emitting laser light having a wavelength of 1064 nm or less.

The surface treatment apparatus may be disposed in a snout between the annealing apparatus and the plating apparatus.

The present invention provides a method and apparatus for plating high strength steel such as advanced high strength steel (AHSS) after irradiating the high strength steel with at least one of laser light and plasma to remove Si/Mn/Al oxides from the surface of the high strength steel, modify the surface of the high strength steel, or make the surface of the high strength steel suitable for a post process such as a zinc plating process.

The present invention also provides a method for plating high strength steel such as AHSS after rapidly and effectively removing Si/Mn/Al oxides from the surface of the high strength steel or rapidly and effectively modifying the surface of the high strength steel so as to allow the plating process to be continuously performed.

The present invention also provides a plating method and process that can be continuously performed after an annealing process.

DETAILED DESCRIPTION OF THE INVENTION AND BEST MODE

In the related art, a technique for removing an Fe oxide layer from the surface of a steel sheet using a laser has been proposed. However, unlike an Fe oxide layer formed on the surface of a steel sheet, an oxide layer formed on the surface of a high strength steel sheet during an annealing process is very thin, on the level of several tens to several hundreds of nanometers (nm), and has an island shape (in the case of TWIP steel) or a network shape (in the case of TRIP steel). Furthermore, since the bonding strength of an Si/Mn/Al oxide layer is ten or more times the bonding strength of a Fe oxide layer, a new technique for removing an oxide layer is required.

Therefore, the inventors have invented a technique for removing an Si/Mn/Al oxide layer using plasma, laser light, or a combination of plasma and laser light. The technique will hereinafter be described with reference to the accompanying drawings and analysis data, according to embodiments of the invention.

In the present invention, the term "Si/Mn/Al oxides, an Si/Mn/Al oxide film, or an Si/Mn/Al oxide layer" refers to oxides, an oxide film, or an oxide layer including at least one of Si oxides, Mn oxides, and Al oxides.

Removal of Si/Mn/Al Oxides Using Plasma

Figure 5:
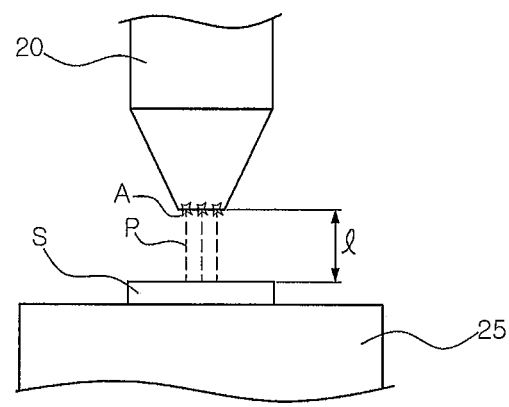
FIG. 5 is a view illustrating an exemplary surface treatment apparatus for removing an oxide film from the surface of high strength steel by using a plasma irradiation device.

A surface treatment apparatus used in an example of the invention is illustrated in FIG. 5. A plasma generator 20 was disposed above a steel sheet (S) placed on a support 25 to generate plasma (P) in the direction of the steel sheet (S).

As the distance (L) between the plasma generator 20 and the steel sheet (S) increases, the temperature of plasma (P) decreases and less energy is transferred from the plasma (P) to the steel sheet (S). An experiment was performed to prove this. Steel sheets (S) were irradiated with plasma (P) using the plasma generator 20 having an output power of 350 W, while varying the distance (L) between the plasma generator 20 and the steel sheets (S) as shown in Table 1 below. The steel sheets (S) were TRIP steel sheets.

TABLE 1

| Samples | Distance (L) | Irradiation period | Plating quality after irradiation with plasma |
| --- | --- | --- | --- |
| Inventive Sample 1 | 1 mm | 1 second | ◯ |
| Inventive Sample 2 | 3 mm | 1 second | Δ |

TABLE 1-continued

| Samples | Distance (L) | Irradiation period | Plating quality after irradiation with plasma |
|---|---|---|---|
| Inventive Sample 3 | 3 mm | 20 seconds | ○ |
| Comparative Sample 1 | 6 mm | 1 second | X |

In Table 1, the column "Plating quality after irradiation with plasma" illustrates data obtained by comparing the plating quality of samples irradiated with plasma and then plated with zinc with the plating quality of a reference sample not irradiated with plasma and only plated with zinc. A sample markedly improved in plating quality is denoted by "○," while a sample slightly improved in plating quality is denoted by "Δ" and a sample not at all improved in plating quality is denoted by "X."

As shown in Table 1, while plasma (P) was generated at the same output power, when the distance (L) that the plasma (P) traveled to a steel sheet (S) was reduced, plating quality was further improved.

However, if the distance (L) to a steel sheet (S) was increased, plating quality was not improved, even though the steel sheet (S) was irradiated with plasma (P). In the experiment, when the distance (L) between the plasma generator 20 and a steel sheet (S) was 6 mm or greater, the temperature of plasma (P) was 200° C. or less at the surface of the steel sheet (S). Thus, it can be understood that Si/Mn/Al oxides can be removed from the surface of a steel sheet when the temperature of plasma (P) at the surface of the steel sheet is at least 200° C.

However, if the temperature of plasma (P) is greater than 900° C., a steel sheet may be damaged by the plasma (P), and thus it may be preferable that the upper temperature limit of plasma (P) at the surface of a steel sheet be 900° C.

Figure 6:
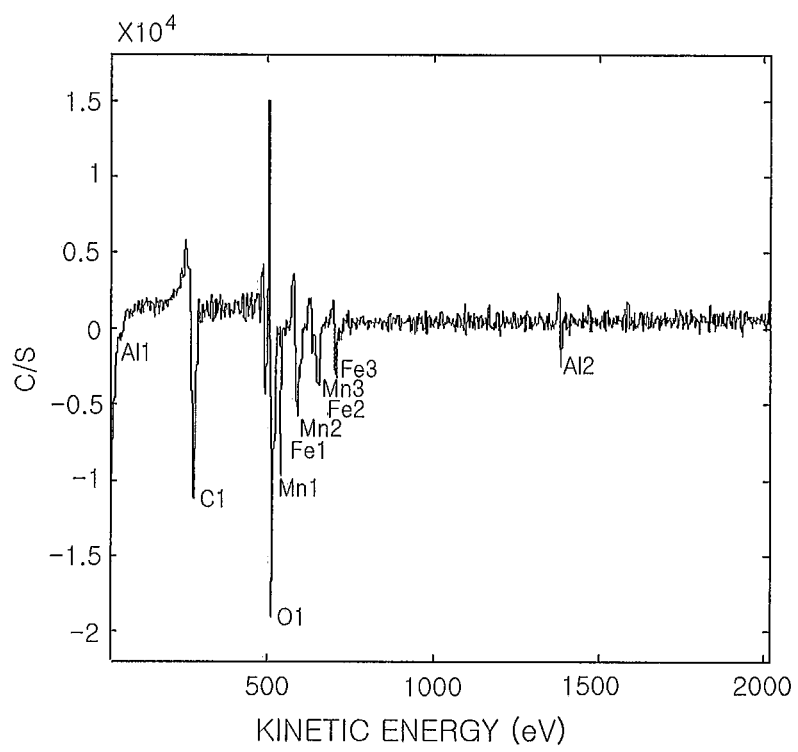
FIGS. 6 and 7 are a surface analysis graph and a depth profile graph of TWIP steel obtained after irradiating the TWIP steel with plasma for 1 second using a 350-W atmospheric plasma irradiation device spaced apart from the TWIP steel by 3 mm.
Figure 7:
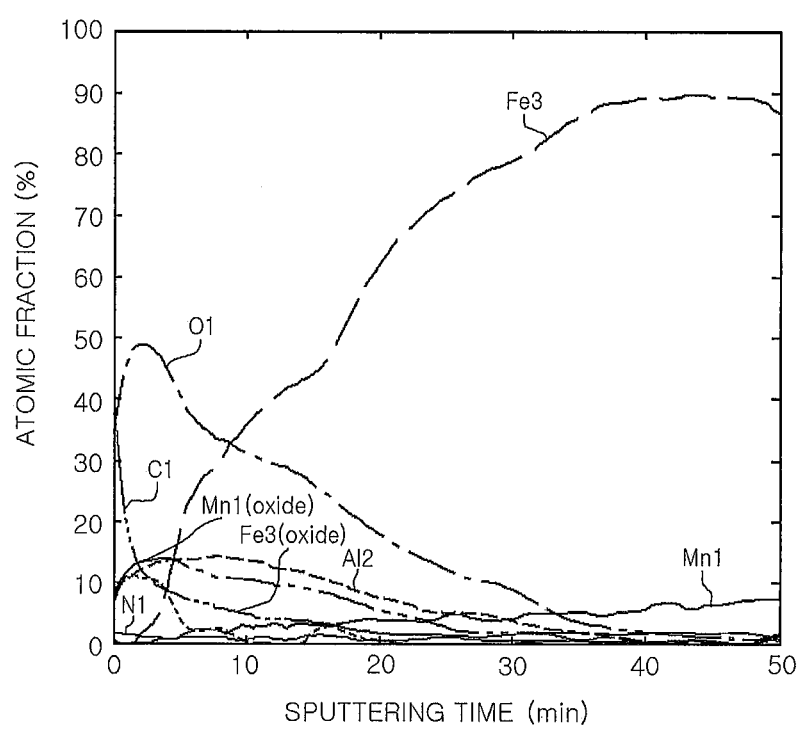

FIGS. 6 and 7 are a surface analysis graph and a depth profile graph of TWIP steel obtained after irradiating the TWIP steel with plasma for 1 second using a 350-W atmospheric plasma irradiation device spaced apart from the TWIP steel (refer to Inventive Sample 2 in Table 1) by 3 mm. The surface analysis graph and depth profile graph of the irradiated TWIP steel are not markedly different from those of the TWIP steel before irradiation (refer to FIGS. 1 and 2). However, Mn and Al oxides on the irradiated TWIP steel are reduced.

Figure 1:
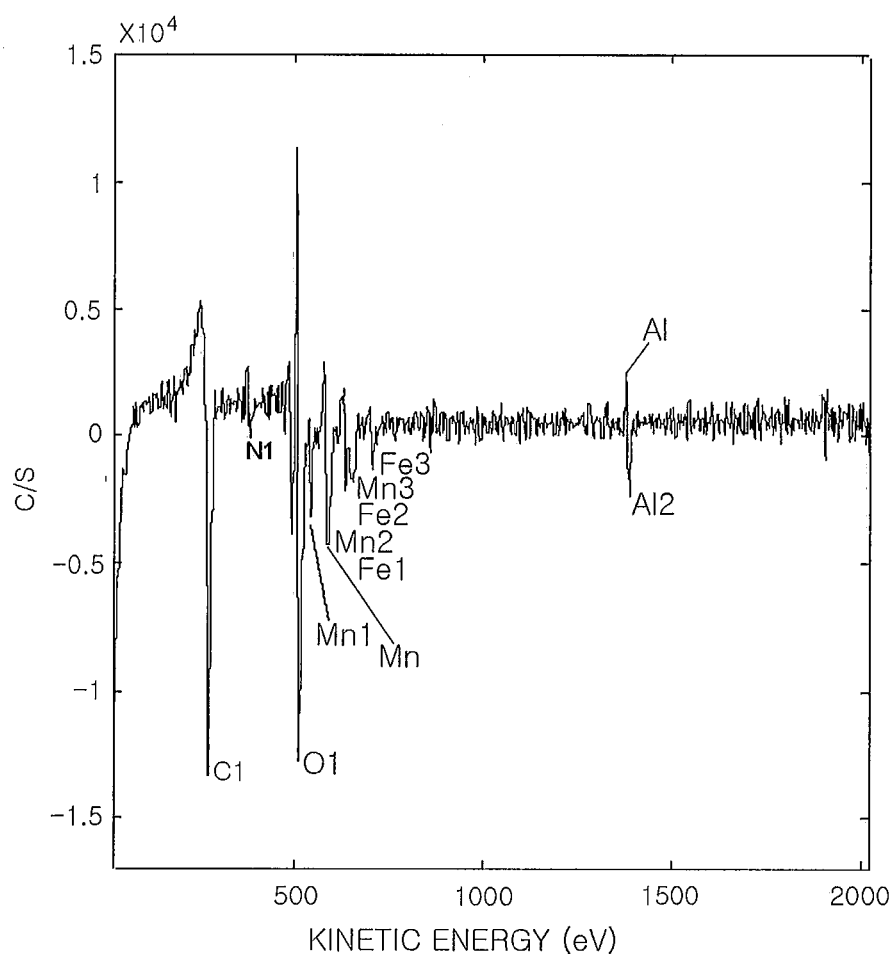
FIGS. 1 and 2 are a surface analysis graph and a depth profile graph of twining induced plasticity (TWIP) steel.

In detail, the amplitudes of Mn1 and Al2 are lower in FIG. 6 than in FIG. 1, but the amplitude of Fe is higher in FIG. 6 than in FIG. 1. This means that Fe is exposed as Mn/Al oxides are reduced by plasma generated by the atmospheric plasma irradiation device spaced apart from the TWIP steel by 3 mm for 1 second.

Figure 2:
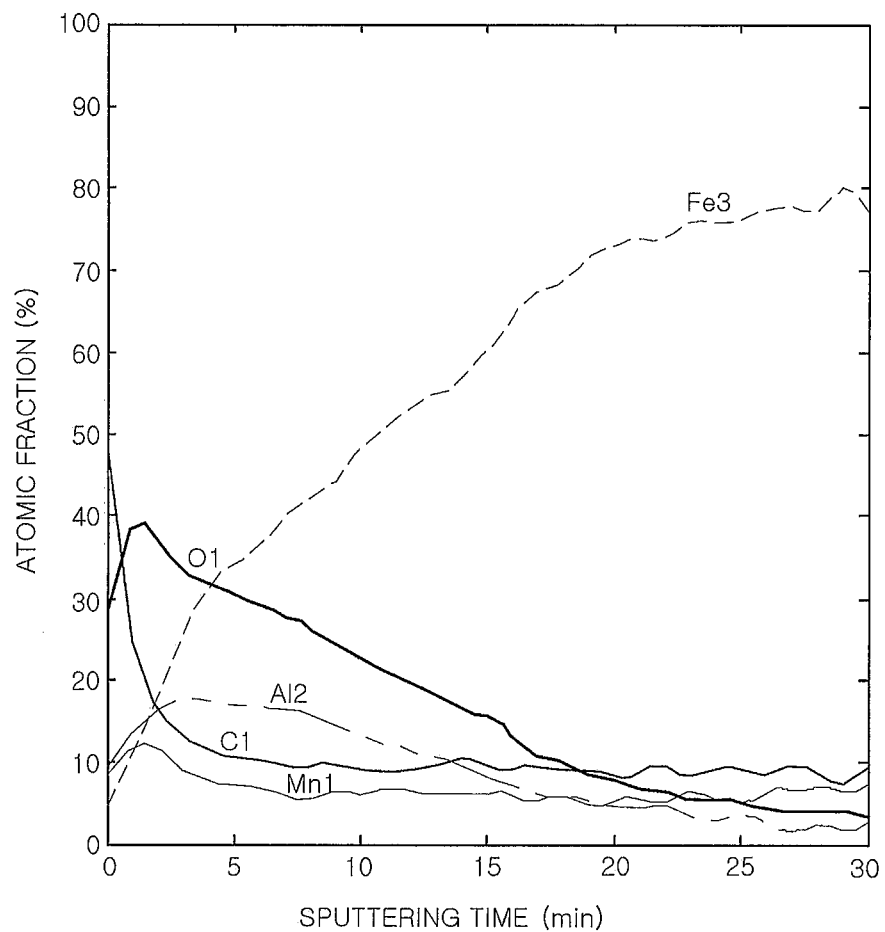

Referring to the depth profile graphs of FIGS. 7 and 2, the fractions of Mn1 and Al2 (on the surface of TWIP steel) at an initial sputtering time are lower in FIG. 7 than in FIG. 2. This means that Mn/Al oxides on the surface of TWIP steel are reduced by plasma generated by the atmospheric plasma irradiation device spaced apart from the TWIP steel by 3 mm for 1 second. That is, since the fractions of Mn/Al oxides are reduced relative to the fraction of Fe, it can be understood that Mn/Al oxides on the surface of the TWIP steel are reduced.

In the experiments explained in the specification of the invention, data on surface analysis and depth profiles were obtained from 20 μm×20 μm samples with a sputtering rate of 1.5 nm/min from 0 minutes to 15 minutes and 4.5 nm/min from 15 minutes to 30 minutes.

Figure 8:
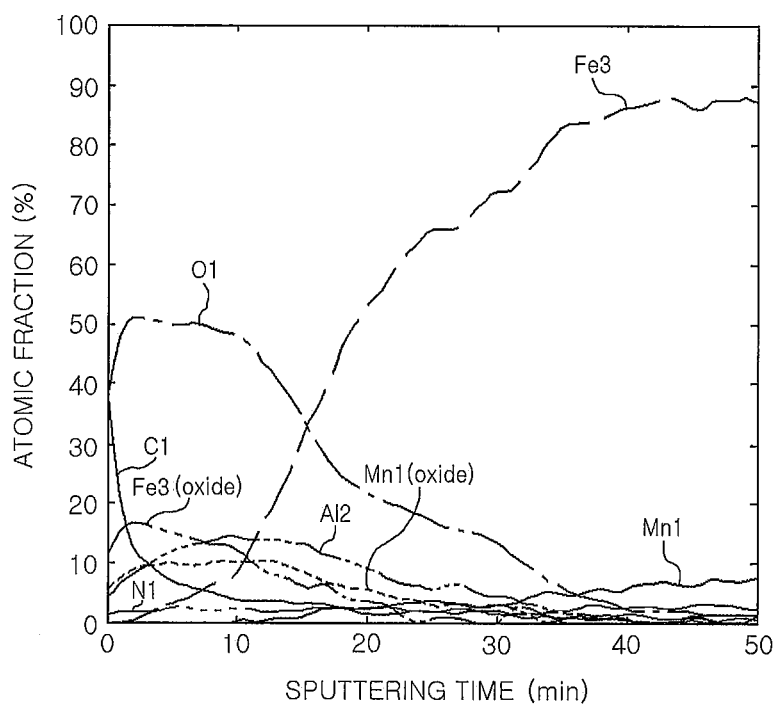
FIG. 8 is a depth profile graph of TRIP steel obtained after irradiating the TRIP steel with plasma for seconds using a 350-W atmospheric plasma irradiation device spaced apart from the TRIP steel by 3 mm.

FIG. 8 is a depth profile graph of TRIP steel obtained after irradiating the TRIP steel with plasma for seconds using a 350-W atmospheric plasma irradiation device spaced apart from the TRIP steel (please refer to Inventive Sample 3 in Table 1) by 3 mm. Referring to FIG. 8, Mn/Al oxides are rescued as compared to FIG. 7.

That is, referring to FIGS. 8 and 2, it is clear that Mn/Al oxides are reduced. As shown in FIG. 8, the amounts of Al oxide and Mn oxide, on the surface of the TRIP steel are markedly reduced. On the other hand, the fraction of Fe on the surface of the TRIP steel is markedly increased (almost no Fe is present on the surface of the TRIP steel in FIG. 2 but in FIG. 8, the fraction of Fe is 15% or more). The reason for this is that Mn/Al oxides are evaporated from the surface of the TRIP steel by plasma, to expose Fe.

In the experiments explained in the specification of the invention, the plasma generator used nitrogen gas as feed gas to prevent carbonization during irradiation with plasma. In addition, the experiments were performed in an air atmosphere without an atmosphere formed of a particular gas being used.

Removal of Si/Mn/Al Oxides Using Plasma and Plasma Arcs

In this experiment, plasma arcs were generated around a nozzle while plasma was generated. In general, plasma arcs are only generated around a nozzle and may damage the surface of steel. Therefore, generally, plasma arcs are not used together with plasma because plasma arcs can only be applied to a steel sheet when a plasma generator is very close thereto.

Si/Mn/Al oxides formed on the surface of high strength steel have an island or network shape. This means that an Si/Mn/Al oxide layer is higher than the surface of high strength steel. Like lightning, plasma arcs touch down on higher points of an object. Thus, the energy of plasma was used to remove Si/Mn/Al oxides.

In a plasma generator (having an output power of 350 W) used in this experiment, plasma arcs were only generated around a plasma nozzle. Thus, a steel sheet was connected to a negative electrode to accelerate ions for maximizing the effect of ion bombardment and to draw plasma arcs to the surface of the steel sheet.

Figure 9:
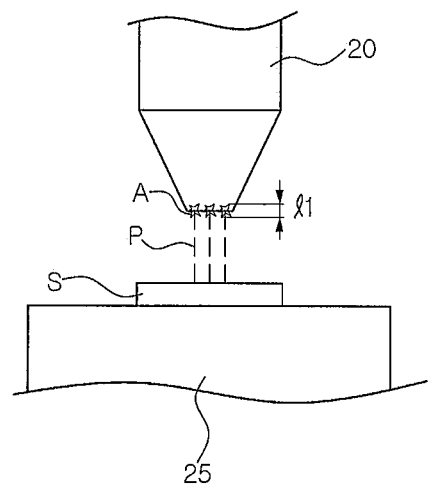
FIGS. 9 and 10 are views illustrating an exemplary plasma generator configured to generate plasma and plasma arcs.
Figure 10:
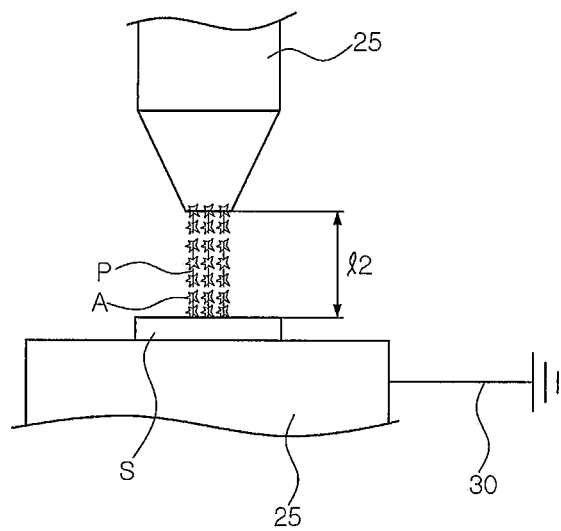

FIG. 9 illustrates a surface treatment apparatus capable of generating plasma, and FIG. 10 illustrates a surface treatment apparatus capable of generating plasma and plasma arcs.

Referring to FIG. 9, plasma arcs (A) are only generated within a distance (L1) from a plasma generator 20. However, when a steel sheet (S) is connected to a negative electrode 30 as shown in FIG. 10, plasma is accelerated and thus plasma arcs proceed for a greater distance (L2).

At this time, nitrogen gas is used as a feed gas of the plasma generator 20 for preventing oxidation of the steel sheet (S).

Figure 11:
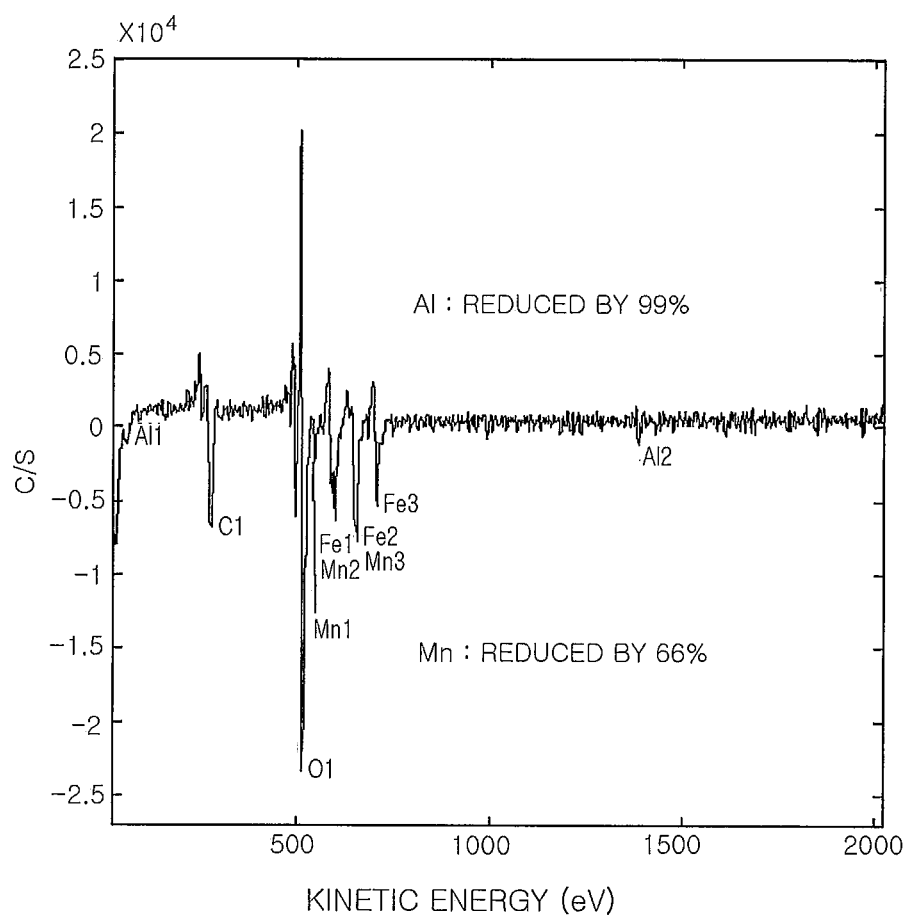
FIGS. 11 and 12 are a surface analysis graph and a depth profile graph of TWIP steel obtained after irradiating the TWIP steel with plasma and plasma arcs using an atmospheric plasma irradiation device.
Figure 12:
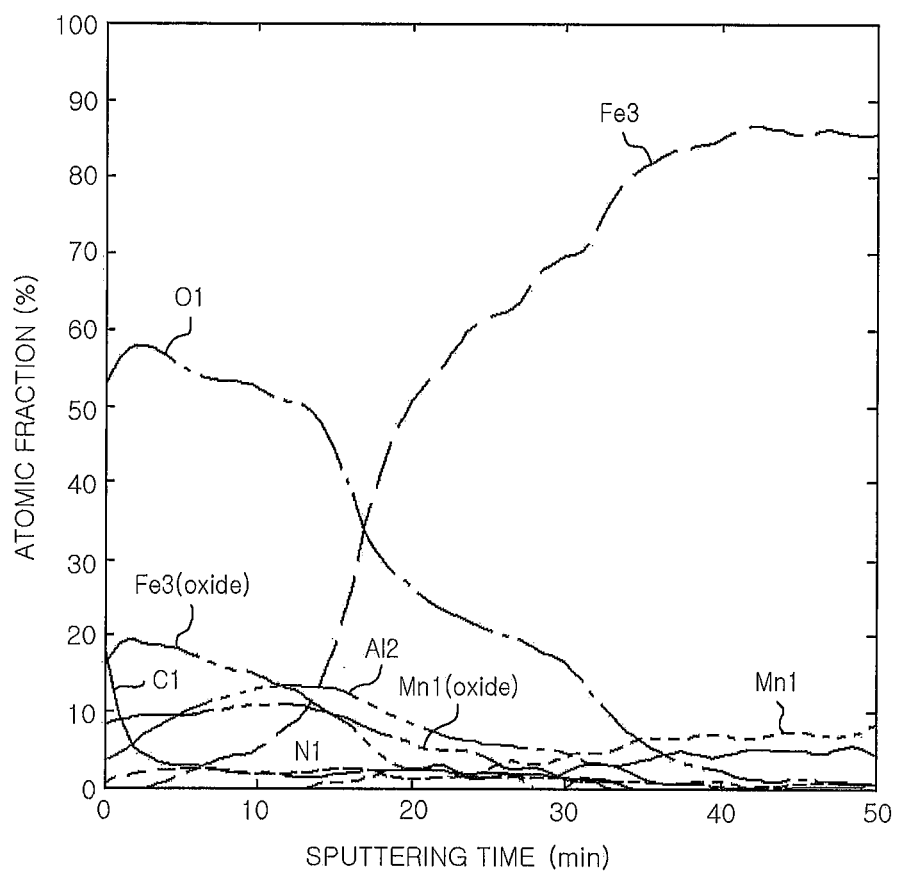

FIGS. 11 and 12 are a surface analysis graph and a depth profile graph of TWIP steel after irradiating the TWIP steel with plasma and plasma arcs for 10 seconds using a 350-W atmospheric plasma irradiation device.

If the surface analysis results of irradiated TWIP steel shown in FIGS. 11 and 12 are compared to the surface analysis results of non-irradiated TWIP steel shown in FIGS. 1 and 2, owing to irradiation for 10 seconds, Mn is reduced by about 66%, and Al is reduced by about 90%. Referring to FIG. 12, the atomic fractions of Mn and Al on the surface of the TWIP steel are markedly reduced, and the atomic fraction of Fe on the surface of the TWIP steel is increased.

These results are similar to the results when TWIP steel is only irradiated with plasma for 20 seconds, and thus it can be understood that if plasma and plasma arcs are used together, the irradiation period can be markedly decreased as compared to the case of only using plasma. That is, if a steel sheet is irradiated with both plasma and plasma arcs, Si/Mn/Al oxides can be sufficiently removed from the steel sheet although the irradiation period is relatively short. Therefore, if an apparatus capable of irradiating a steel strip with both plasma and plasma arcs is installed in a continuous process line, the continuous process line can be extended to a zinc plating process line, to continuously perform processes. A zinc plating process will later be described in detail.

Like FIGS. 11 and 12, FIGS. 13 and 14 are graphs of TRIP steel obtained after irradiating the TRIP steel with plasma and plasma arcs.

Figure 3:
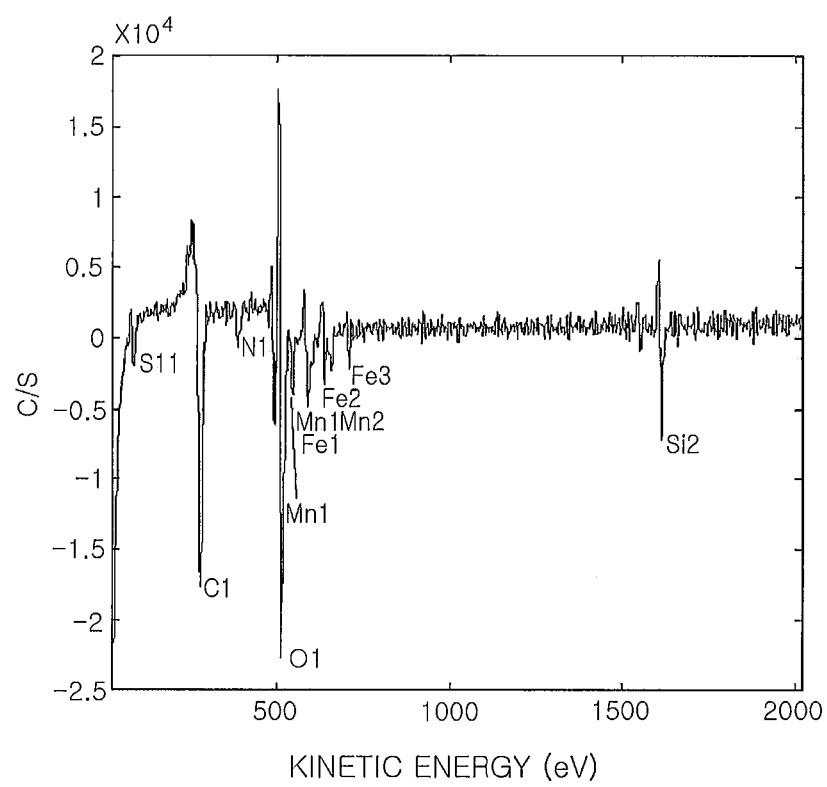
FIGS. 3 and 4 are a surface analysis graph and a depth profile graph of transformation induced plasticity (TRIP) steel.
Figure 4:
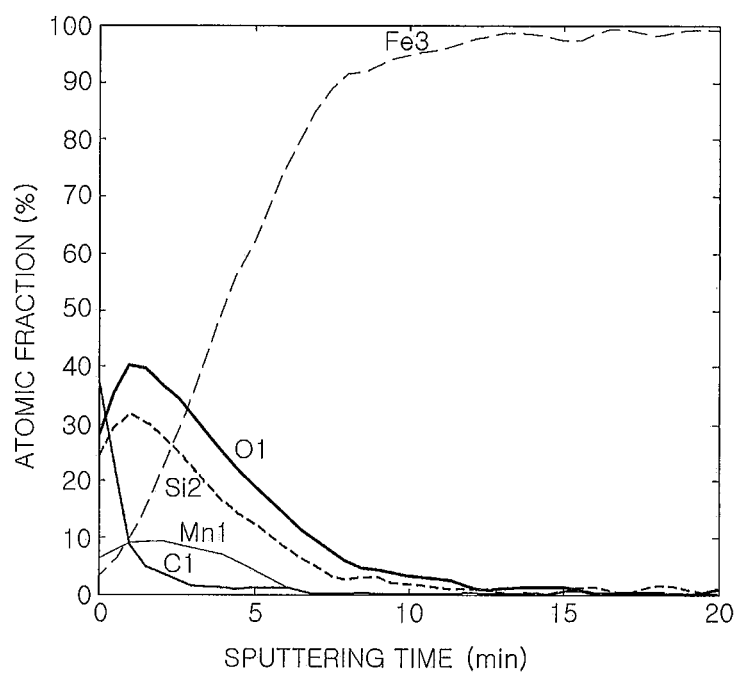
Figure 13:
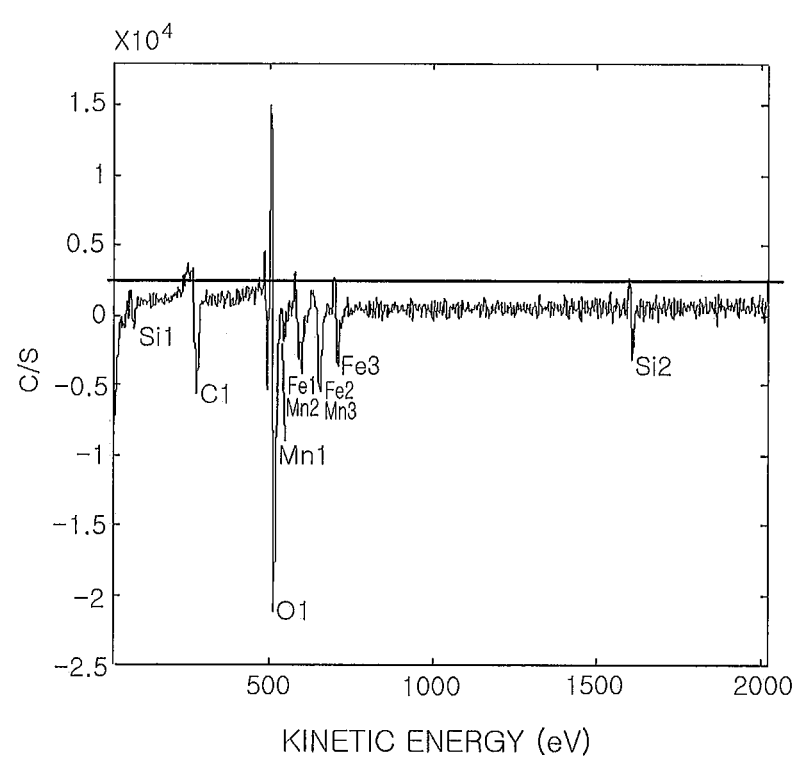
FIGS. 13 and 14 are a surface analysis graph and a depth profile graph of TRIP steel obtained after irradiating the TRIP steel with plasma and plasma arcs using an atmospheric plasma irradiation device.
Figure 14:
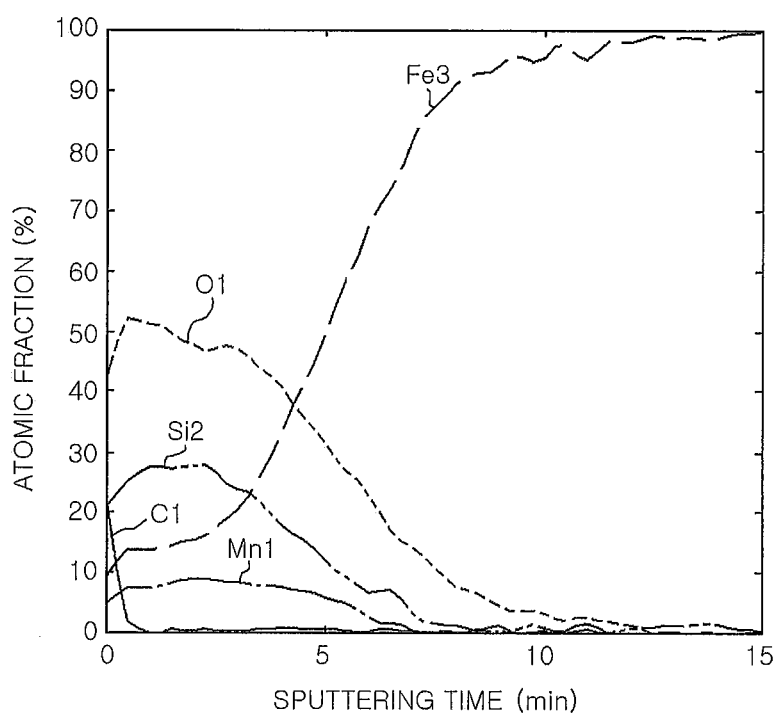

If the surface analysis results of irradiated TRIP steel shown in FIGS. 13 and 14 are compared to the surface analysis results of non-irradiated TRIP steel shown in FIGS. 3 and 4, owing to irradiation with process and plasma arcs for 10 seconds, Si and Mn are reduced to such a degree that it is difficult to find Si and Mn in the graphs of FIGS. 13 and 14. Referring to FIG. 14, the atomic fractions of Si and Mn on the surface of the TRIP steel are markedly reduced, and the atomic fraction of Fe on the surface of the TRIP steel is increased. Since Fe was exposed, the TRIP steel could be easily plated.

Although a steel sheet can be directly grounded to a negative electrode, a support supporting the steel sheet and formed of a conductive material may be grounded to the negative electrode. In this case, it is easy to move or replace the steel sheet.

Removal of Si/Mn/Al Oxides Using Laser

Figure 15:
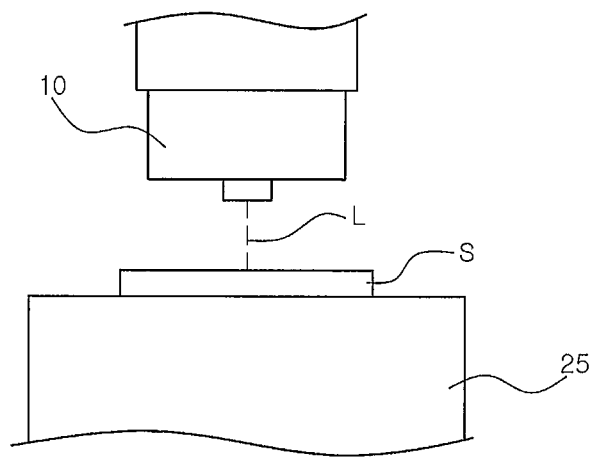
FIG. 15 is a schematic view illustrating a surface treatment apparatus for removing an oxide film from high strength steel using a laser.

In this experiment of the invention, a steel sheet was irradiated with laser light. FIG. 15 illustrates a surface treatment apparatus including a laser 10.

As shown in FIG. in the surface treatment apparatus, the laser 10 was disposed above a steel sheet (S) placed on a support 25, and a certain area of the steel sheet (S) was irradiated with laser light (L) while moving the laser 10 at a constant speed. Thereafter, the surface of the steel sheet (S) was analyzed, and the steel sheet (S) was plated with zinc.

Figure 16:
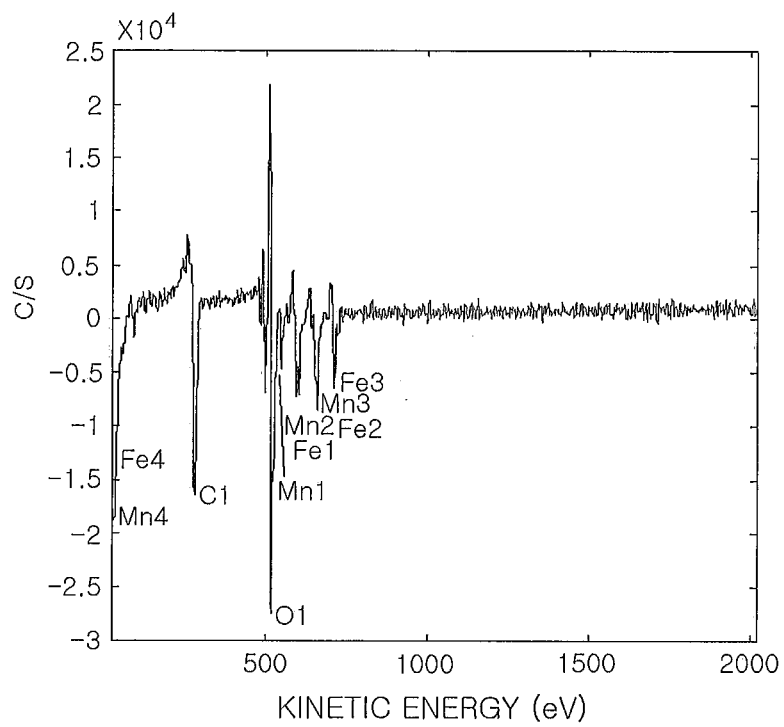
FIGS. 16 and 17 are a surface analysis graph and a depth profile graph of TWIP steel obtained after irradiating the TWIP steel using a continuous wave (CW) laser at output power of 25 W.
Figure 17:
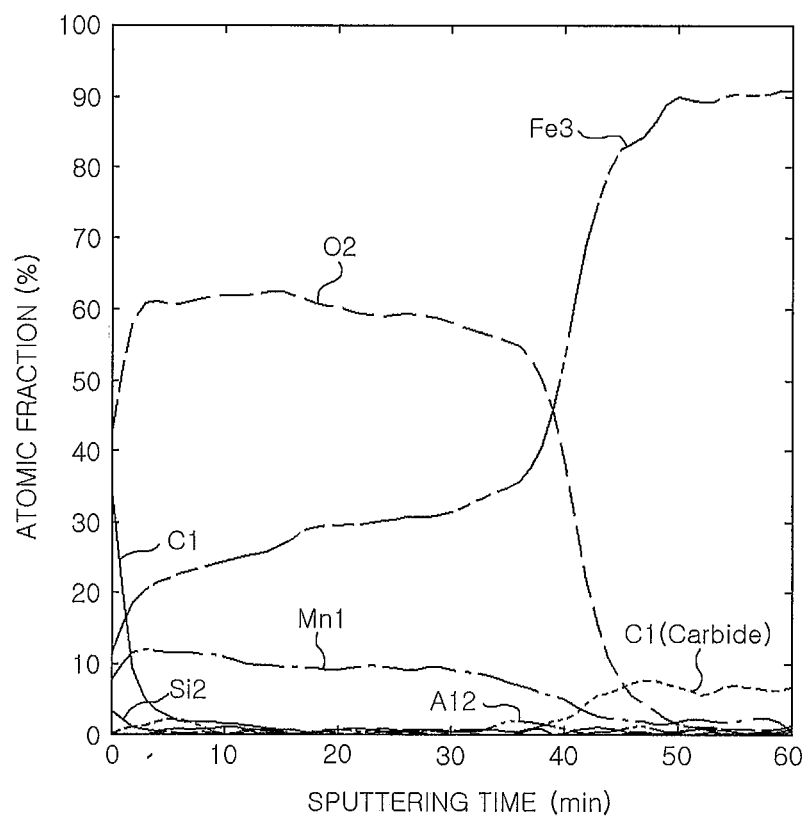

The results of the experiment are shown in Table 2 and FIGS. 16 and 17.

TABLE 2

| Samples | Laser types | Output power (W) | Laser speed (mm/s) | Plating quality after irradiation with laser light |
|---|---|---|---|---|
| Inventive Sample 4 | Pulse laser | 35 | 250 | ○ |
| Inventive Sample 5 | Continuous Laser | 25 | 3000 | ○ |
| Comparative Sample 2 | Pulse laser | 24 | 3000 | X |
| Comparative Sample 3 | Pulse laser | 22 | 3000 | X |
| Comparative Sample 4 | Pulse laser | 18 | 3000 | X |

In the experiment, an Nd YAG 1064 nm pulse laser and an Nd YAG 1064 nm continuous wave (CW) layer were used while varying the output power and speed of the lasers.

In Table 2, the column "Plating quality after irradiation with laser light" illustrates data obtained by comparing the plating quality of samples irradiated with laser light and then plated with zinc with the plating quality of a reference sample not irradiated with laser light but only plated with zinc. A sample markedly improved in plating quality is denoted by "○," and a sample not improved in plating quality is denoted by "X."

As shown in Table 2, Si/Mn/Al oxides could be removed using a pulse laser in the case in which the output power of the pulse laser was high and the moving speed of the pulse layer was low for giving a large quantity of impulse to the Si/Mn/Al oxides. However, in the case of a CW laser, Si/Mn/Al oxides could be removed even though the output power of the CW laser was relatively low and the moving speed of the CW laser was relatively high.

Thus, it can be understood that Si/Mn/Al oxides can be removed using a high-power Nd YAG pulse laser or a Nd YAG CW laser.

Particularly, when the output power was the same, the CW laser (please refer to Inventive Sample 5) was much more effective in improving plating quality than the pulse laser (please refer to Comparative Sample 2). That is, CW lasers are more effective in removing Si/Mn/Al oxides than pulse lasers.

Furthermore, since a CW laser can generate a laser beam, a wide area can be irradiated at a time of using a CW laser. Therefore, the surface of a steel strip can be treated using a CW laser during a continuous process.

FIGS. 16 and 17 are a surface analysis graph and a depth profile graph of TWIP steel after irradiating the TWIP steel using a CW laser at output power of 25 W.

If the surface analysis results of the irradiated TWIP steel shown in FIGS. 16 and 17 are compared to the surface analysis results of the non-irradiated TWIP steel shown in FIGS. 1 and 2, Al oxides are almost entirely removed from the surface of the irradiated TWIP steel, and Mn oxides are also largely removed (please refer to FIG. 16). In addition, as shown in FIG. 17, the atomic fraction of Fe on the irradiated TWIP steel is markedly increased to 10% or more as compared to the atomic fraction of Fe (about 5%) on the non-irradiated TWIP steel. Therefore, it can be understood that Fe of the TWIP steel can be exposed after the TWIP steel is irradiated using a CW laser.

Figure 18:
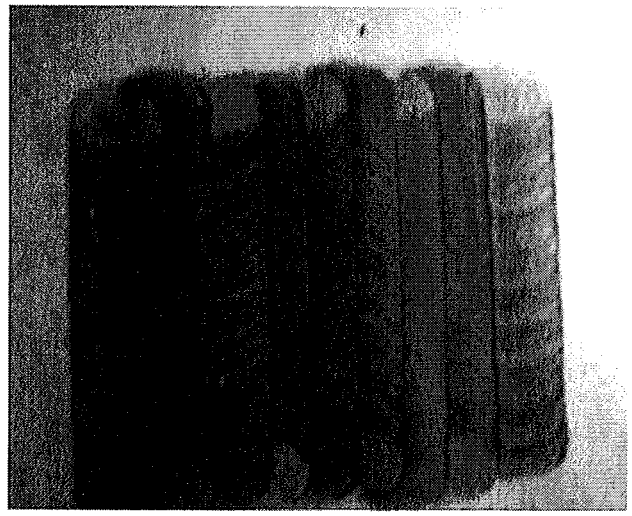
FIG. 18 is a surface image of a steel sheet irradiated using a pulse laser in an air atmosphere.

FIG. 18 is a surface image of a steel sheet irradiated using a laser at room temperature in an air atmosphere. As shown in FIG. 18, if a steel sheet is irradiated in an air atmosphere using a laser, a carbon layer is formed on the steel sheet due to carbonization, which has a negative effect on the quality of plating in the following zinc plating process.

Figure 19:
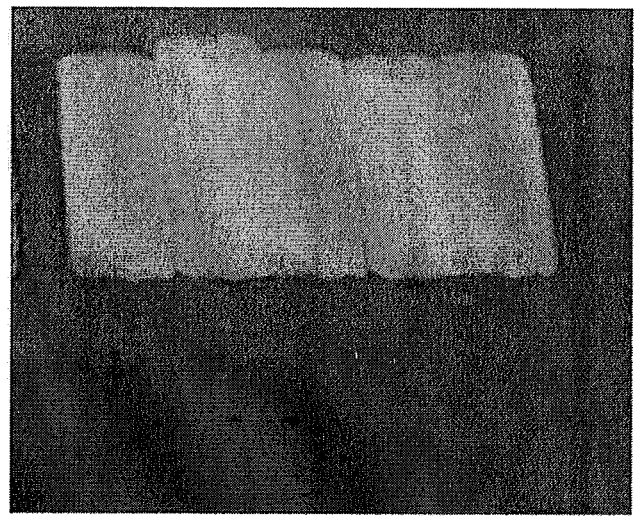
FIG. 19 is a surface image of a steel sheet irradiated using a pulse laser in a nitrogen atmosphere.

FIG. 19 is a surface image of a steel sheet irradiated using a pulse laser in a nitrogen atmosphere. As shown in FIG. 19, if a steel sheet is irradiated using a laser in a nitrogen atmosphere, the surface of the steel sheet is smooth because carbonization does not occur, which is advantageous for the following zinc plating.

In addition, it may be preferable that the spot size of laser light be 1 mm or less or the width of a laser beam be 1 mm or less. When steel sheets were irradiated with laser light in the same air atmosphere while varying the spot size of the laser light, carbonization did not occur when the spot size of laser light was 1 mm or less. That is, it is considered that if the spot size of laser light is 1 mm or less, carbonization can be prevented although a nitrogen atmosphere is not formed.

In addition, an experiment was performed while varying the wavelength of laser light to 1064 nm, 532 nm, and 355 nm. Si/Mn/Al oxides were removed when the wavelength of laser light was 1064 nm, 532 nm, or 355 nm. It may be preferable that the wavelength of laser light be 1064 nm in terms of energy efficiency.

Application to Zinc Plating Process

Figure 20:
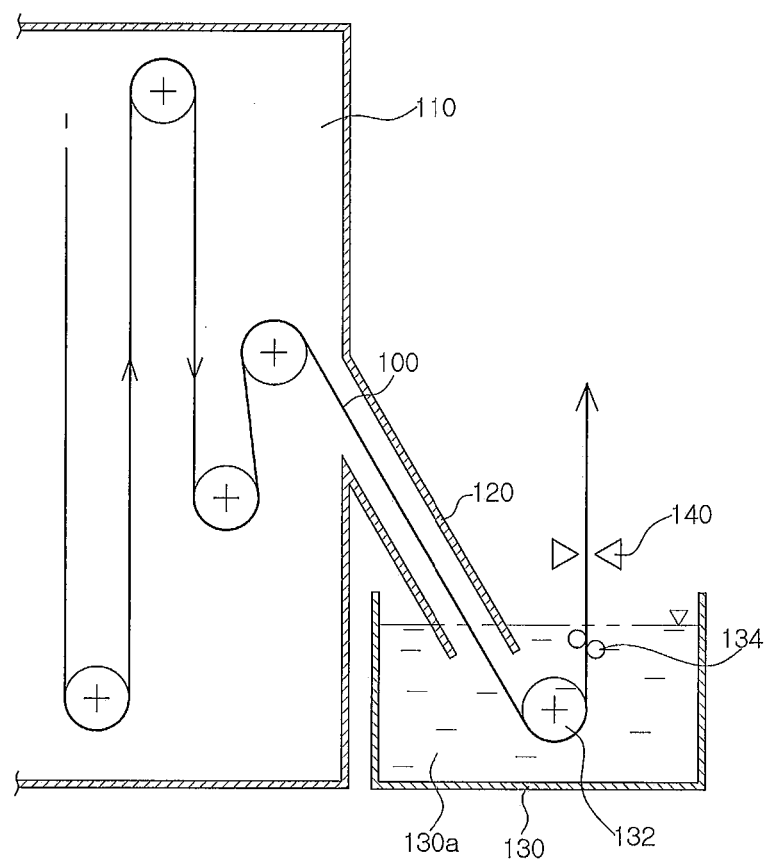
FIG. 20 is a schematic view for explaining a zinc plating process of the related art.

FIG. 20 is a view for explaining a zinc plating process of the related art.

While a cold-rolled and coiled steel sheet 100 is continuously fed along a pay-off reel (not shown) and a welding machine (not shown), the steel sheet 100 is heat-treated in an annealing apparatus 110 having a maximum temperature in the range of 700° C. to 800° C. to remove residual stress from the steel sheet 100. Then, while maintaining the temperature of the heated steel sheet 100 at a temperature suitable for plating, the heated steel sheet 100 is fed into a plating bath 130 filled with plating liquid, that is, molten zinc 130a.

A snout 120 connects the annealing apparatus 110 to the plating bath 130 of a zinc plating apparatus so as to prevent the heated steel sheet 100 from being oxidized by contact with air. Inert gas is filled in the snout 120 to prevent the steel sheet 100 from being oxidized and thus being defectively plated.

After passing through the annealing apparatus 110, the snout 120, and a sink roll 132 and stabilizing rolls 134 of the plating bath 130, the steel sheet 100 passes through an air knife 140 that is disposed just above the plating bath 130 to control the amount of zinc plated on the steel sheet 100 according to customer requirements.

Thereafter, the plated steel sheet 100 passes through a skin pass mill (not shown) where the surface roughness and shape of the plated steel sheet 100 are adjusted. Then, the plated steel sheet 100 is cut by a cutting machine (not shown) and is coiled around a tension reel (not shown) as a plated steel coil product.

Figure 21:
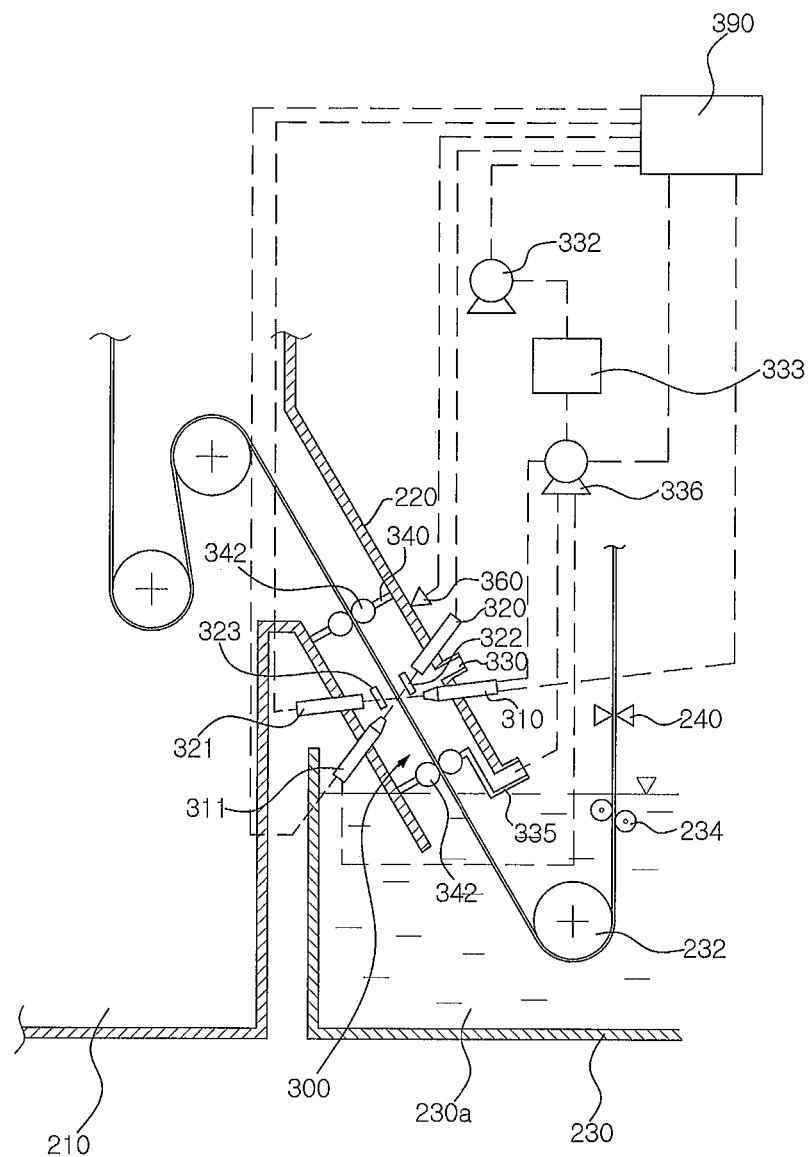
FIG. 21 is a schematic view illustrating a zinc plating process according to an embodiment of the invention.

When a steel sheet is annealed, Si/Mn/Al oxide films are formed on the high strength steel. Thus, in a process for plating a high strength steel with zinc according to the embodiment of the invention, a surface treatment apparatus is disposed in a snout connected between an annealing apparatus and a zinc plating apparatus as shown in FIG. 21. Since the surface treatment apparatus is disposed in the snout in the embodiment of the invention, the invention can be easily realized by modifying the snout of existing equipment.

While a coiled steel sheet 200 made of high strength steel (e.g. TWIP steel and TRIP steel) is continuously fed along a pay-off reel (not shown) and a welding machine (not shown), the steel sheet 100 is heat-treated in an annealing apparatus 210. During a heat treatment in the annealing apparatus 210, Si/Mn/Al oxide films are formed on the steel sheet 200. Then, the steel sheet 200 is fed into a surface treatment apparatus 300 disposed in a snout 220 and is then carried into a plating bath 230 of a plating apparatus filed with molten zinc 230a.

To rapidly treat the continuously fed steel sheet 200 for removing the Si/Mn/Al oxide films, plasma generators 310 and 311 and lasers 320 and 321 of the surface treatment apparatus 300 are disposed at both sides of the steel sheet 200. Windows 322 and 323 are disposed in a manner such that laser light emitted from the lasers 320 and 321 passes through the windows 322 and 323, and a pump 336 is connected to the plasma generators 310 and 311 to supply feed gas to the plasma generators 310 and 311.

For example, a Mn/Al oxide film having a thickness of about 150 nm to 200 nm may be formed on TRIP steel, and an Si/Mn oxide film having a thickness of about 50 nm or less may be formed on TRIP steel. Therefore, the lasers 320 and 321 may not be used or installed according to the type of steel and the thickness of an oxide film to be removed.

Sealing rolls 342 and blocking parts 340 for fixing the sealing rolls 342 are disposed at both sides of the surface treatment apparatus 300 so that the interior and exterior of the surface treatment apparatus 300 can be separated, to block zinc vapor rising from the plating bath 230 and other contaminants.

A nitrogen gas supply hole 330 is formed in the outer wall of the surface treatment apparatus 300, and a pump 332 and a nitrogen gas storage tank 333 are connected to the nitrogen gas supply hole 330. The pump 332 supplies nitrogen gas from the nitrogen gas storage 333 to the interior of the surface treatment apparatus 300 so that a nitrogen gas atmosphere can initially be formed in the surface treatment apparatus 300.

A suction hole 335 is formed in the blocking parts 340 or the outer wall of the surface treatment apparatus 300 to allow nitrogen gas to be removed from the surface treatment apparatus 300. Nitrogen gas supplied through the nitrogen gas supply hole 330 and heated by the steel sheet 200 having a high temperature is discharged through the suction hole 335. The pump 336 is connected to the suction hole 335 for removing nitrogen from the surface treatment apparatus 300 and supplying the nitrogen gas to the plasma generators 310 and 311 as feed gas or discharging the nitrogen gas.

Since nitrogen gas taken from the interior of the surface treatment apparatus 300 contains Si/Mn/Al oxides separated from the steel sheet 200, the nitrogen gas may be supplied to the plasma generators 310 and 311 after being filtered. In some cases, the nitrogen gas taken from the interior of the surface treatment apparatus 300 may be discharged to a treatment apparatus, and nitrogen gas stored in the nitrogen gas storage 333 may be supplied to the plasma generators 310 and 311.

Since high-temperature nitrogen gas is supplied to the plasma generators 310 and 311 as feed gas, through the pump 336 connected to the suction hole 335, the plasma generators 310 and 311 can generate high-energy plasma as compared to the case in which room-temperature nitrogen gas is supplied to the plasma generators 310 and 311 as feed gas. That is, the effect of a high-power plasma generator can be obtained using a relatively low-power plasma generator.

As well as feed gas being supplied through the suction hole 335, the internal pressure of the surface treatment apparatus 300 is maintained at a level lower than atmospheric pressure through the suction hole 335, which increases the effective irradiation ranges from the plasma generators 310 and 311 and the lasers 320 and 321. Therefore, the plasma generators 310 and 311 and the lasers 320 and 321 can be spaced apart from the steel sheet 200 by a greater distance to prevent a collision or fictional contact caused by shaking of the steel sheet 200.

A sensor 360 is disposed in the surface treatment apparatus 300 to detect the internal pressure of the surface treatment apparatus 300 in real time and send the detected pressure values to a control unit 390.

The control unit 390 is connected to the plasma generators 310 and 311, the lasers 320 and 321, the pumps 332 and 336, and the sensor 360 so as to control the plasma generators 310 and 311, the lasers 320 and 321, and the pumps 332 and 336 according to data input from the sensor 360, information on the type of steel, and a user's instructions.

Figure 22:
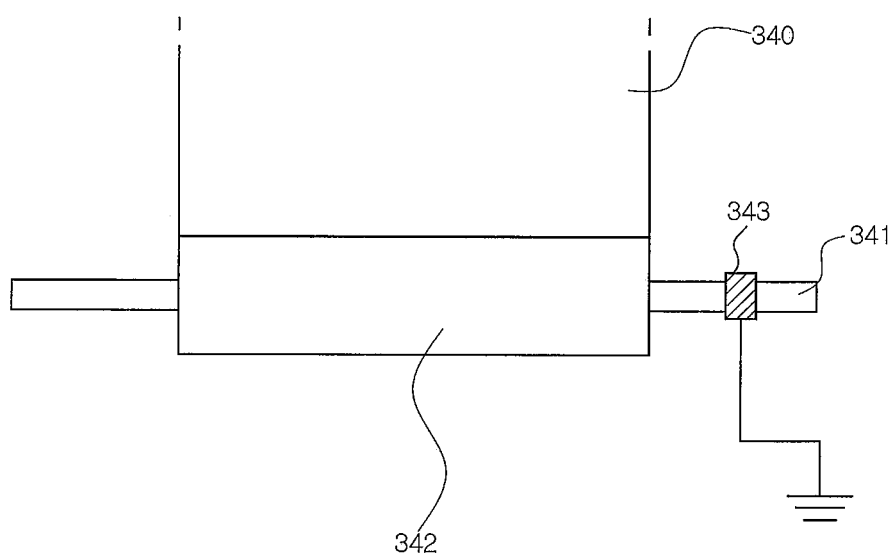
FIG. 22 is a sectional view illustrating a sealing roll used in the zinc plating process of the embodiment of the invention.

The sealing rolls 342 are formed of an electrically chargeable material, and ground terminals 343 (refer to FIG. 22) are attached to roll shafts 341 of the sealing rolls 342. The ground terminals 343 are grounded to a negative electrode. As a result, the sealing rolls 342 are grounded to the negative electrode, and the steel sheet 200 making contact with the sealing rolls 342 when being fed into the surface treatment apparatus 300 is grounded to the negative electrode.

If the steel sheet 200 is not grounded to the negative electrode, the effective irradiation ranges of plasma arcs generated by the plasma generators 310 and 311 are relatively short, as compared to the case in which the steel sheet 200 is grounded to the negative electrode. In this case, the distance between the steel sheet 200 and the plasma generators 310 and 311 is reduced, which increases the possibility of frictional contact or collisions between the steel sheet 200 and the plasma generators 310 and 311 as the steel sheet 200 may be shaken while being fed. Therefore, it may be difficult to irradiate the steel sheet 200 with plasma arcs.

In the embodiment of the invention, the sealing rolls 342 are grounded. However, instead of being grounded, additional rolls making contact with the steel sheet 200 may be disposed in the surface treatment apparatus 300, and the additional rolls may be grounded.

In the surface treatment apparatus 300, the plasma generators 310 and 311 generate plasma having a temperature of 200° C. to 900° C. in the direction of the steel sheet 200 and are spaced apart from the steel sheet 200 so that plasma arcs can be generated in the direction of the steel sheet 200 together with plasma. Since the steel sheet 200 is grounded to the negative electrode, plasma and plasma arcs generated from the plasma generators 310 and 311 can reach the steel sheet 200. Therefore, oxide films formed on the surfaces of the steel sheet 200 can be rapidly removed.

The plasma generators 310 and 311 may be continuously arranged in the width direction of the steel sheet 200 to irradiate the entire width of the steel sheet 200 with plasma and plasma arcs simultaneously.

Furthermore, in the embodiment of the invention, the lasers 320 and 321 may emit laser beams parallel to the width of the steel sheet 200. The lasers 320 and 321 may be 1064 nm Nd YAG CW lasers capable of rapidly removing oxide films from the steel sheet 200. Each laser beam may have a width equal to or smaller than 1 mm for preventing carbonization.

Furthermore, in the embodiment of the invention, the plasma generators 310 and 311 and the lasers 320 and 321 are aligned in a manner such that laser beams, plasma, and plasma arcs can be directed to the same portion of the steel sheet 200. In this case, although the steel sheet 200 is rapidly fed, oxide films formed on the steel sheet 200 can be continuously removed.

The interior of the surface treatment apparatus 300 may be maintained at a temperature equal to or lower than 800° C. Otherwise, an additional heater may need to be used to maintain the interior of the surface treatment apparatus 300 at a temperature equal to or greater than 800° C., the maximum temperature in the annealing apparatus 210. In addition, the interior of the surface treatment apparatus 300 may be maintained at a temperature equal to or higher than 200° C. In this case, when the steel sheet 200 is fed into the plating bath 230, the temperature of the steel sheet 200 may be about 460° C., suitable for zinc plating. That is, if the internal temperature of the surface treatment apparatus 300 is lower than 200° C., an additional heater may be used to heat the steel sheet 200 before the steel sheet 200 is fed into the plating bath 230.

A zinc plating process according to an embodiment of the invention may be performed as follows.

A steel sheet 200 unwound from a coil passes through the annealing apparatus 210 and is then introduced into the surface treatment apparatus 300. While the steel sheet 200 passes through the sealing rolls 342 separating the interior and exterior of the surface treatment apparatus 300, the steel sheet 200 is grounded to the negative electrode through the sealing rolls 342. The interior of the surface treatment apparatus 300 is maintained in a low-pressure nitrogen atmosphere (lower than atmospheric pressure) by feedback control through the suction hole 335, the nitrogen gas supply hole 330, and the sensor 360.

In the low-pressure nitrogen atmosphere, both sides of the steel sheet 200 are irradiated with laser beams, plasma, and plasma. Thus, Si/Mn/Al oxide films formed on the surfaces of the steel sheet 200 during an annealing process in the annealing apparatus 210 are removed, and then the steel sheet 200 is carried out from the interior of the surface treatment apparatus 300 through the sealing rolls 342 in a surface state suitable for zinc plating.

After passing through the surface treatment apparatus 300, the steel sheet 200 is fed into the plating bath 230 where the steel sheet 200 is plated while being carried along a sink roll 232 and stabilizing rollers 234. Then, the plated steel sheet 200 passes through an air knife 240 disposed just above the steel sheet 200. The air knife 240 adjusts the amount of zinc plated on the steel sheet 200 according to customer requirements.

Thereafter, the plated steel sheet 200 passes through a skin pass mill (not shown) where the surface roughness and shape of the plated steel sheet 200 are adjusted. Then, the plated steel sheet 200 is cut by a cutting machine (not shown) and is coiled around a tension reel (not shown) as a plated steel coil product.

The invention claimed is:

1. A plating method comprising:
   heating high strength steel;
   treating a surface of the high strength steel to remove at least one of a Mn oxide, an Al oxide, and an Si oxide formed on the surface of the high strength steel during the heating of the high strength steel; and
   plating the surface-treated high strength steel,
   wherein treating the surface of the high strength steel comprises irradiating the high strength steel with plasma and plasma arcs while negatively charging the high strength steel to attract the plasma arcs to the surface of the high strength steel.

2. The plating method of claim 1, wherein the plasma has a temperature of 200° C. to 900° C.

3. The plating method of claim 1, wherein nitrogen gas is supplied as a feed gas for the plasma.

4. The plating method of claim 3, wherein treating the surface of the high strength steel is performed in an isolated chamber after removing gas from the chamber to lower an internal pressure of the chamber and thus to increase an irradiation range of plasma.

5. The plating method of claim 1, wherein treating the surface of the high strength steel further comprises irradiating the high strength steel with plasma and plasma arcs and CW (continuous wave) laser light having a wavelength of 1064 nm or less.

6. The plating method of claim 5, wherein the laser light has a spot size of 1 mm or less, or the laser light is a laser beam having a width of 1 mm or less.

7. The plating method of claim 6, wherein in the treating of the surface of the high strength steel, the laser light, plasma arcs, and the plasma are directed to have the same irradiating position.

* * * * *